United States Patent
Hall

(10) Patent No.: US 10,099,223 B2
(45) Date of Patent: Oct. 16, 2018

(54) HAMMER MILL DISC REFURBISHMENT PROCESS

(71) Applicant: Randall K. Hall, Canal Winchester, OH (US)

(72) Inventor: Randall K. Hall, Canal Winchester, OH (US)

(*) Notice: Subject to any disclaimer, the term of this patent is extended or adjusted under 35 U.S.C. 154(b) by 918 days.

(21) Appl. No.: 14/580,874

(22) Filed: Dec. 23, 2014

(65) Prior Publication Data

US 2016/0175848 A1    Jun. 23, 2016

(51) Int. Cl.
| | |
|---|---|
| *B02C 13/04* | (2006.01) |
| *B02C 13/28* | (2006.01) |
| *B23P 6/00* | (2006.01) |
| *B23P 6/04* | (2006.01) |
| *B02C 13/20* | (2006.01) |

(52) U.S. Cl.
CPC .............. *B02C 13/28* (2013.01); *B02C 13/04* (2013.01); *B02C 13/205* (2013.01); *B23P 6/00* (2013.01); *B23P 6/04* (2013.01); *B02C 2013/2808* (2013.01); *Y10T 29/4975* (2015.01); *Y10T 29/49726* (2015.01); *Y10T 29/49728* (2015.01); *Y10T 29/49732* (2015.01); *Y10T 29/49737* (2015.01); *Y10T 29/49742* (2015.01)

(58) Field of Classification Search
CPC ....... B02C 13/28; B02C 13/26; B02C 13/205; B02C 13/04; B23P 6/00; B23P 6/04; Y10T 29/49728; Y10T 29/49726; Y10T 29/49737; Y10T 29/49732; Y10T 29/4975; Y10T 29/49742

USPC ......................................................... 241/194
See application file for complete search history.

(56) References Cited

U.S. PATENT DOCUMENTS

| | | | |
|---|---|---|---|
| 4,056,232 A | 11/1977 | Linnerz et al. | |
| 4,222,530 A | 9/1980 | Whitney | |
| 4,313,575 A | 2/1982 | Stepanek | |
| 4,406,415 A | 9/1983 | Greer | |
| 4,504,019 A * | 3/1985 | Newell | B02C 13/28 241/186.2 |
| 4,613,088 A | 9/1986 | Hausler et al. | |
| 4,650,129 A | 3/1987 | Newell et al. | |
| 4,830,294 A | 5/1989 | Hauslet et al. | |
| 4,898,334 A | 2/1990 | Manschwetus | |
| 5,072,888 A | 12/1991 | Stelk | |
| 5,188,303 A | 2/1993 | Hoof | |
| 6,168,382 B1 | 1/2001 | Nolan et al. | |
| 6,412,718 B1 | 7/2002 | Kohl et al. | |

(Continued)

*Primary Examiner* — Jermie Cozart
(74) *Attorney, Agent, or Firm* — Jason H. Foster; Kremblas & Foster

(57) ABSTRACT

A method and apparatus for a hammer mill's worn discs. The disc can be refurbished by removing a peripheral portion of the disc and placing a ring on the peripheral rim left on the disc. The ring preferably has a tapered, radially inwardly facing surface that abuts the peripheral rim of the disc to form annular gaps on both sides of the disc/ring junction. Molten metal, such as during a welding process, is placed in the annular gaps to form annular beads that mount the ring to the disc effectively as if the ring, beads and disc were one integral piece. The disc/ring combination is preferably heat-treated to metallurgically improve the disc in order to prepare the disc's peripheral edge, which is made up of the ring, for impacts during use.

6 Claims, 5 Drawing Sheets

(56) References Cited

U.S. PATENT DOCUMENTS

2006/0008352 A1* 1/2006 Segletes .................. B23K 9/18
416/244 A

* cited by examiner

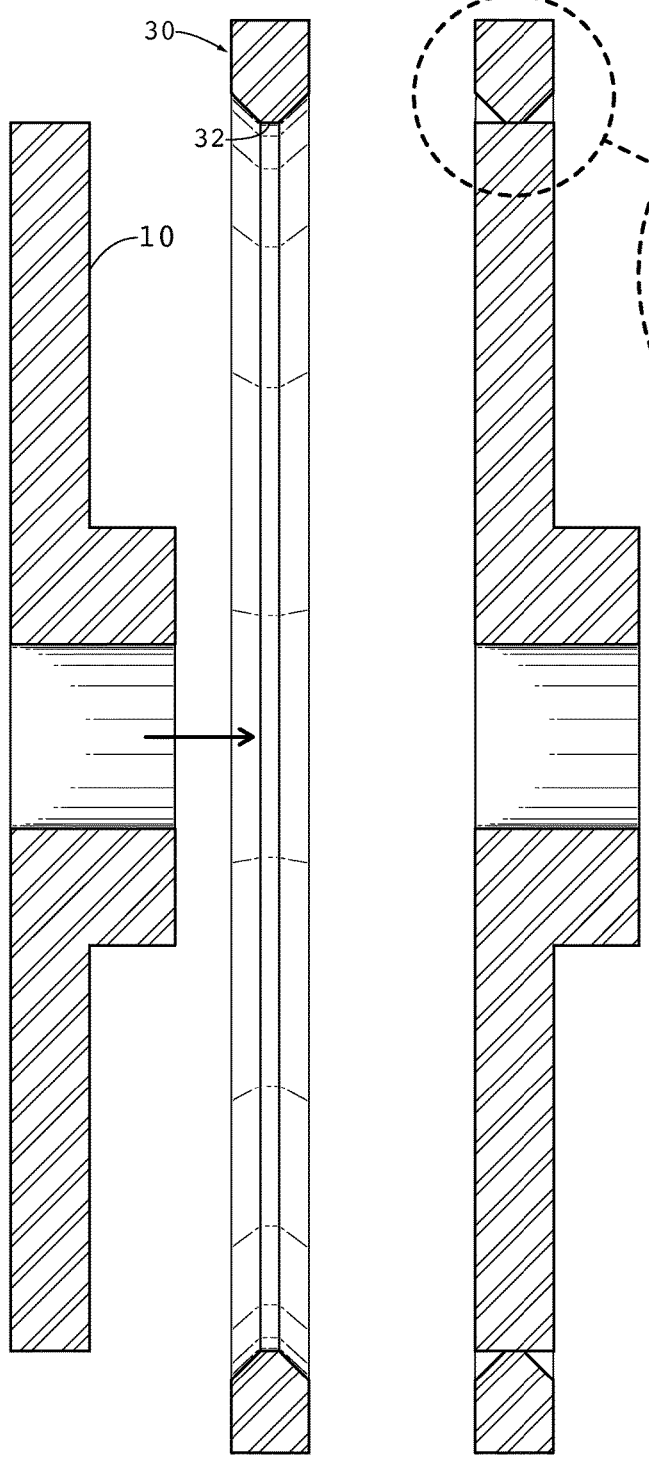
Fig. 6      Fig. 7

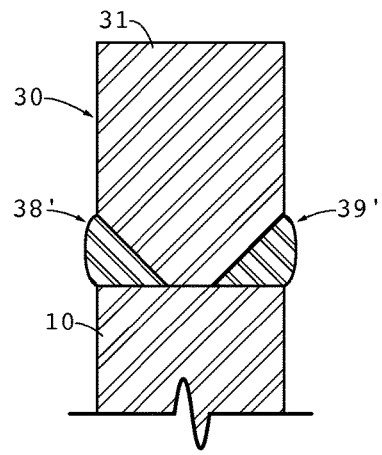
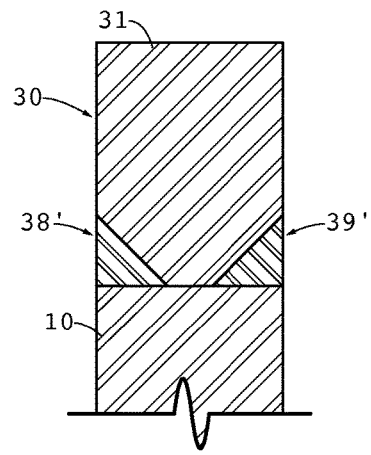
Fig. 8　　　　　Fig. 9
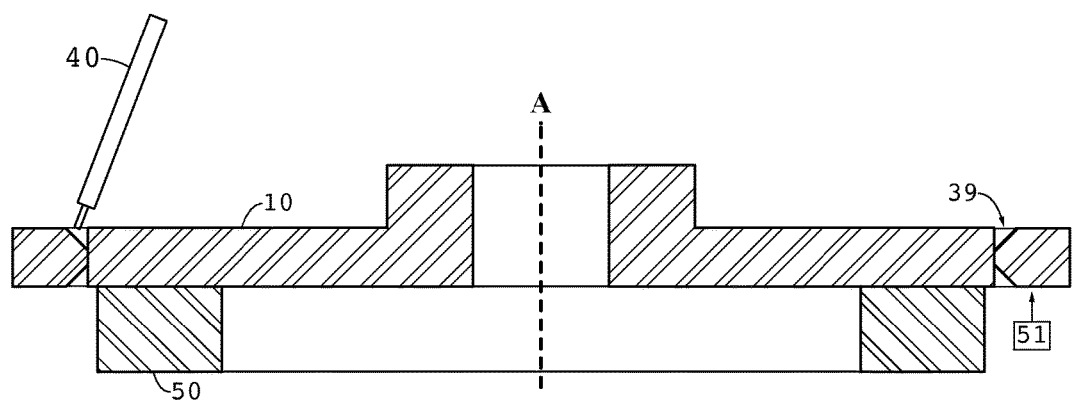
Fig. 10
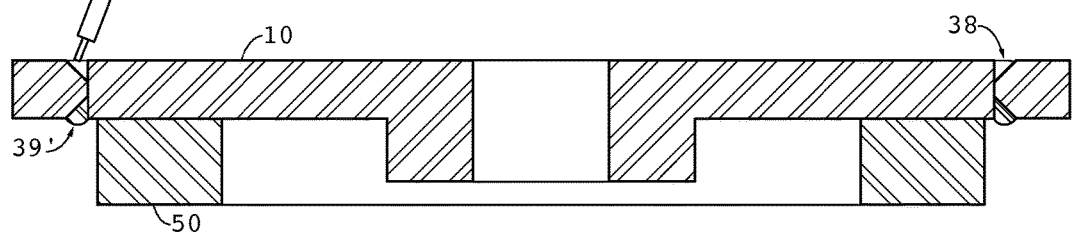
Fig. 11

HAMMER MILL DISC REFURBISHMENT PROCESS

CROSS-REFERENCES TO RELATED APPLICATIONS (Not Applicable)

STATEMENT REGARDING FEDERALLY-SPONSORED RESEARCH AND DEVELOPMENT (Not Applicable)

THE NAMES OF THE PARTIES TO A JOINT RESEARCH AGREEMENT.

(Not Applicable)

REFERENCE TO AN APPENDIX (Not Applicable)

BACKGROUND OF THE INVENTION

The invention relates generally to hammer mills, and more particularly to a process for refurbishing the discs of a hammer mill after substantial wear necessitates removing the discs from service.

Hammer mills, which are also known as "hammer breakers", are machines used for crushing or shredding items, such as automobiles, scrap metal and paving materials, into smaller pieces, a process referred to as comminution. A typical hammer mill is shown in U.S. Pat. No. 4,056,232 to Linnerz et al., which is herein incorporated by reference. Hammer mills have a stationary housing in which a rotor body is rotatably mounted. The rotor body consists of a plurality of discs rigidly connected to a rotor shaft. Each of the discs of some hammer mills weighs about 9000 lbs. Rods extend through the discs and are spaced radially from, and extend parallel to, the rotor shaft. Massive hammers are pivotably mounted between the discs on the rods. The hammers are thus pivotably mounted axially of the rotor shaft on the rods in a circumferentially spaced relationship around the periphery of the discs. Comminution occurs when the hammers impact the object that is fed into their path. As the material breaks up, it passes out of the hammer mill. Because the rotor shaft rotates at about 600 revolutions per minute (rpm), each hammer swings at about 200 miles per hour against the object in its path.

If the material to be comminuted is abrasive, the outer surfaces of the discs will be subjected to considerable wear and will become worn by the impinging material. During their lifetimes, discs lose significant amounts of metal from their peripheral edges. Because of this, the discs become no longer usable and must be replaced. Conventional replacement involves removing a worn disc and replacing it with a new disc. Because this is a very expensive replacement, the need arises for another way of replacing worn discs without the waste involved in discarding or merely recycling the worn disc.

BRIEF SUMMARY OF THE INVENTION

A process is described herein for refurbishing the discs of a hammer mill after their peripheral surfaces have become so worn that they have little to no useful life remaining. The process involves removing at least one, but preferably all, worn discs from the rotor shaft of the rotor body. The outer periphery of the disc is cut away by a torch, grinder, plasma cutter, or any metal-cutting and/or removal means. A metal ring is formed having a radially-inwardly facing surface that is about the size of the material that was worn away. The ring preferably has a V-shaped radially inwardly facing surface, and the narrowest point abuts the peripheral rim of the disc that is formed after the worn portion is removed. The ring is then welded to the disc, the combination is heat treated and balanced and then the refurbished disc is returned to service by replacement in an array of such discs as is conventional—a rotor body. Thus, the refurbished disc subsequently serves the same purpose as the original disc prior to refurbishment, which is to provide a structure to which swinging hammers are mounted and against which objects are directed in order for the swinging hammers to comminute the objects.

A hammer mill disc is also described herein for use in a hammer mill that comminutes objects, such as automobile bodies. The disc comprises a central disc portion that is formed of a first metal composition. The central disc portion has a radially-outwardly facing peripheral rim. A ring portion surrounds the central disc portion and is formed of a second metal composition. The ring has a radially-outwardly facing surface that receives impacts from objects that are to be comminuted by the hammer mill during use and a radially inwardly-facing surface that abuts the peripheral rim. A first annular bead, which is formed of a third metal composition, is interposed between the peripheral rim and the radially inwardly-facing surface on a first side of the ring. A second annular bead is interposed between the peripheral rim and the radially inwardly-facing surface on a second, opposite side of the ring from the first side. In a preferred embodiment, the radially inwardly-facing surface of the ring has a V-shaped cross-section and the narrowest portion thereof abuts the peripheral rim of the disc. This thereby forms a first annular space on the first side of the ring in which the first annular bead is mounted and a second annular space on the second side of the ring in which the second annular bead is mounted.

The exact dimensions of the ring that is attached to the peripheral edge of the disc are not critical, because different rings will be made for different disc sizes. It is contemplated that any disc of any size that is used in a hammer mill can be refurbished using this method. Thus, a person of ordinary skill will apply the principles described herein to a disc of any size.

One ring size that is contemplated for use in refurbishment of a hammer mill disc has an outer diameter of about 78 inches, an inner diameter of about 67 inches, and a (radially-directed) thickness of about 5 and ½ inches. The ring preferably has a V-shaped inwardly shaped surface (when viewed in cross section) with the legs of the V being angled relative to each other by about 90 degrees. The "point" of the V-shaped surface, which is not necessarily without visible thickness but is the solid surface closest to where the two angled sides intersect, is about one-half inch wide. The ring is about four inches wide along its axial length. Such a ring is mounted to a disc cut away to an outer diameter of about 67 inches. The completed disc has an outer diameter of about 78 inches.

BRIEF DESCRIPTION OF THE SEVERAL VIEWS OF THE DRAWINGS

FIG. 6 is a side view in section illustrating the ring of FIG. 4 and the disc of FIG. 3 (through the lines 6-6 of FIG. 3) prior to insertion of the disc in the ring.

FIG. 7 is a side view in section illustrating the disc after insertion in the ring, with a magnified view of the encircled portion.

FIG. 8 is a side view in section illustrating the magnified view of the encircled portion of FIG. 7 after molten metal has been placed in the void around the V-shaped portion of the ring and the peripheral edge of the disc.

FIG. 9 is a side view in section illustrating the magnified view of the encircled portion of FIG. 7 after the molten metal in the void around the V-shaped portion of the ring and the peripheral edge of the disc has been ground away.

FIG. 10 is a schematic side view in section illustrating a disc during the step of welding one side of a ring on the peripheral rim thereof.

FIG. 11 is a schematic side view in section illustrating the disc of FIG. 10 during the step of welding the second, opposite side of the ring on the peripheral rim of the disc.

Figure 1:
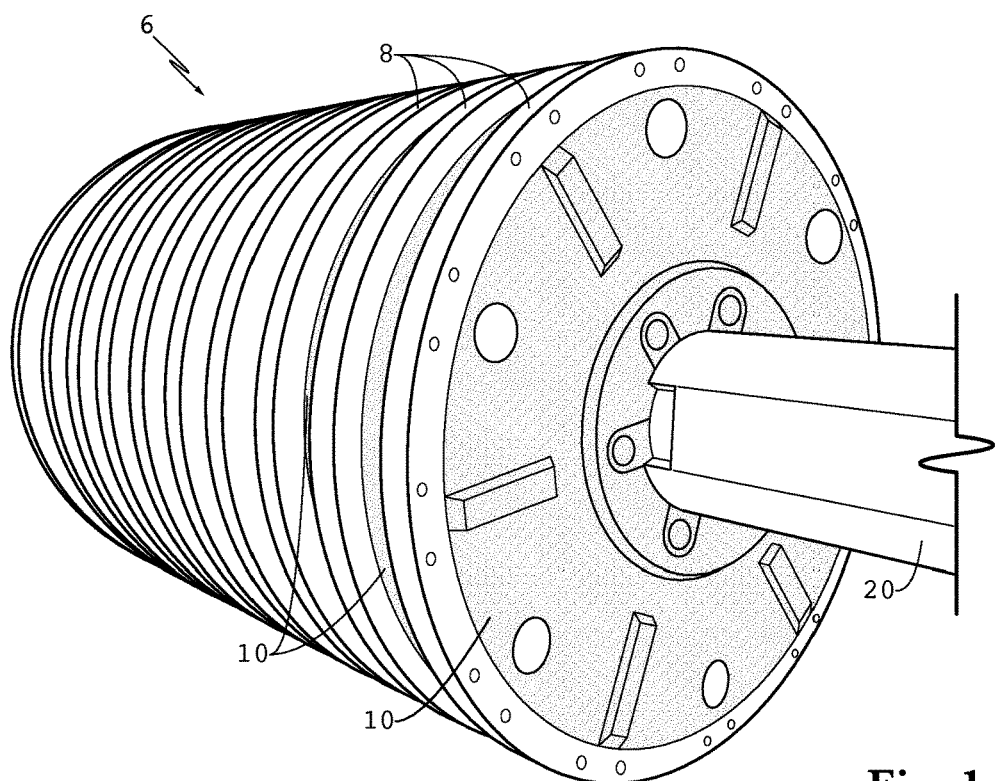
FIG. 1 is a view in perspective illustrating a conventional rotor body showing a plurality of substantially unused discs rigidly connected to a rotor shaft. The hammers are not visible in this illustration.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

FIG. 1 shows a conventional rotor body 6 having a plurality of substantially unused discs 10 mounted to a shaft 20 having a central axis about which the discs 10 rotate, such as when driven by a diesel engine (not visible) or other rotary prime mover. The rotating hammers are not visible, nor are the rods that are spaced from the axis of rotation and to which the hammers mount but are known due to being conventional. The rotor body 6 is used in a conventional manner, which includes forcibly driving objects into the edges 8 of the discs 10 as the rotor body 6 is rotating rapidly, thereby forcing the hammers against the objects to break up the objects.

Figure 2:
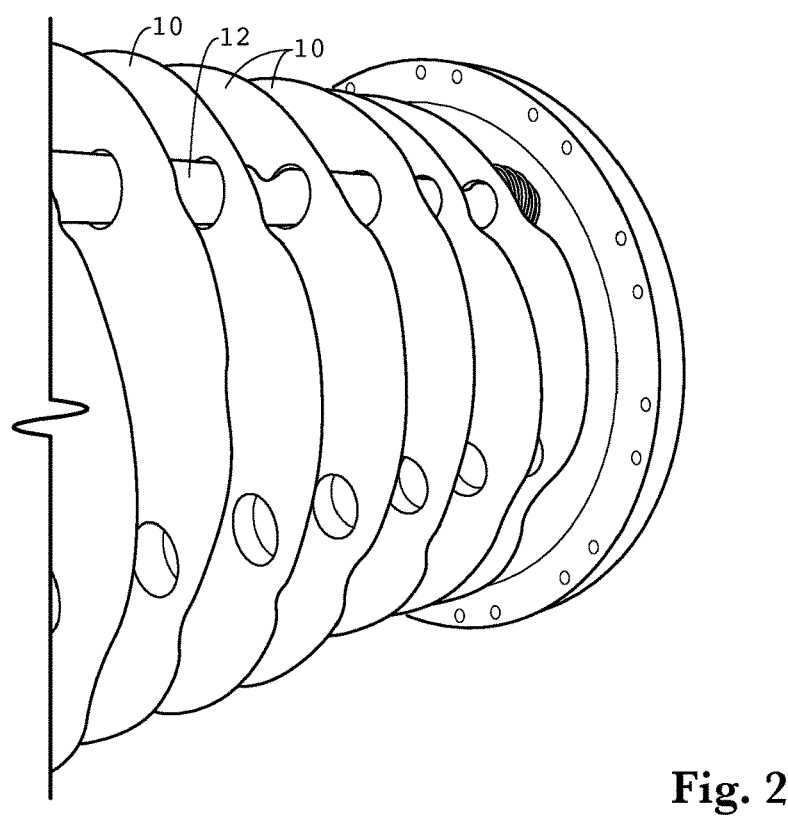
FIG. 2 is a view in perspective illustrating a conventional rotor body with worn discs rigidly connected to a rotor shaft.

Once the rotor body 6 is used in this conventional manner for an extended period, the edges 8 of the discs 10 are severely worn as shown in FIG. 2. In order to carry out the refurbishment of the worn discs 10, each disc is preferably separated from all other discs. However, it is contemplated that the discs can be refurbished while remaining together as long as the rods, such as the rod 12 shown in FIG. 2, and hammers (not visible in FIG. 2) are removed. In a preferred method, in order to remove the discs 10 from one another, either the rotor shaft is removed from the rotor body, or a conventional torch or any other suitable metal-cutting tool is used to sever the shaft that connects each disc to each adjacent disc.

Figure 3:
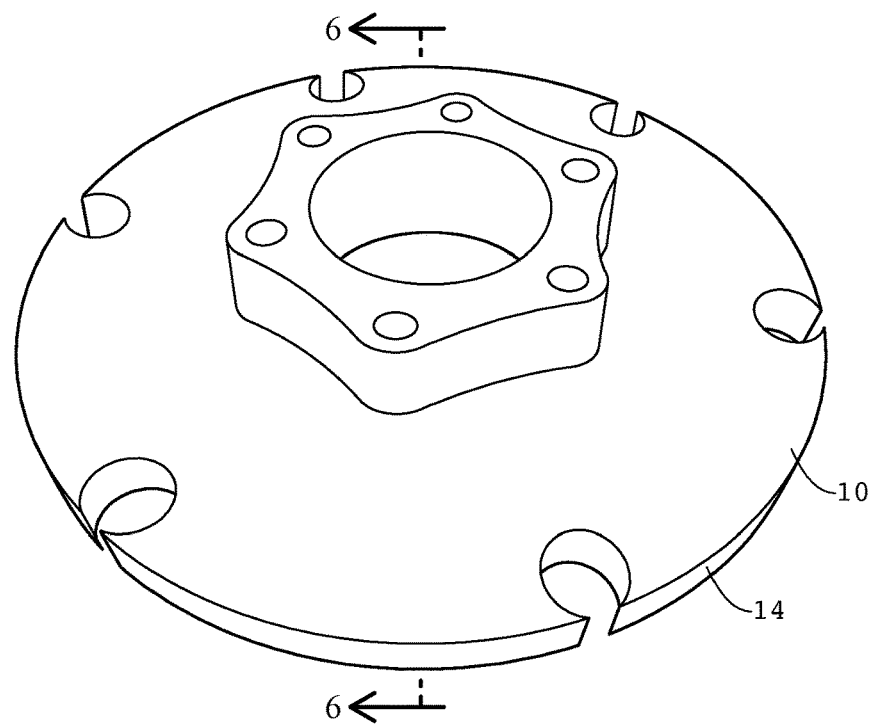
FIG. 3 is a view in perspective illustrating a single disc that has been removed from the rotor body, and that has had its outer peripheral edge removed.

Once a disc is separated from the rotor body 6, the worn peripheral portion of the disc 10 is cut away using a torch, plasma cutter or any other suitable metal-cutting tool to expose a radially-outwardly facing peripheral rim 14, as shown in FIG. 3. The disc 10 is cut along a circular curve that is at a radial point from the axis of rotation where the disc 10 has substantial and consistent thickness. The disc 10 in the illustration of FIG. 3 was originally about four inches thick. Thus, the worn portion of the disc 10, which is shown in FIG. 2 and tapers in thickness to the edge 8 due to wear, is removed to a point where the axial thickness is substantially four inches all around the peripheral rim 14.

The peripheral rim 14 preferably defines a cylindrical surface, having an axial length of about four inches and following a substantially circular curvature when viewed along the axis of rotation of the disc 10, although non-circular and/or non-cylindrical surfaces are contemplated. The circular cylindrical surface of the peripheral rim 14 provides a substantial surface to which the ring 30 can be attached, as described below.

Figure 4:
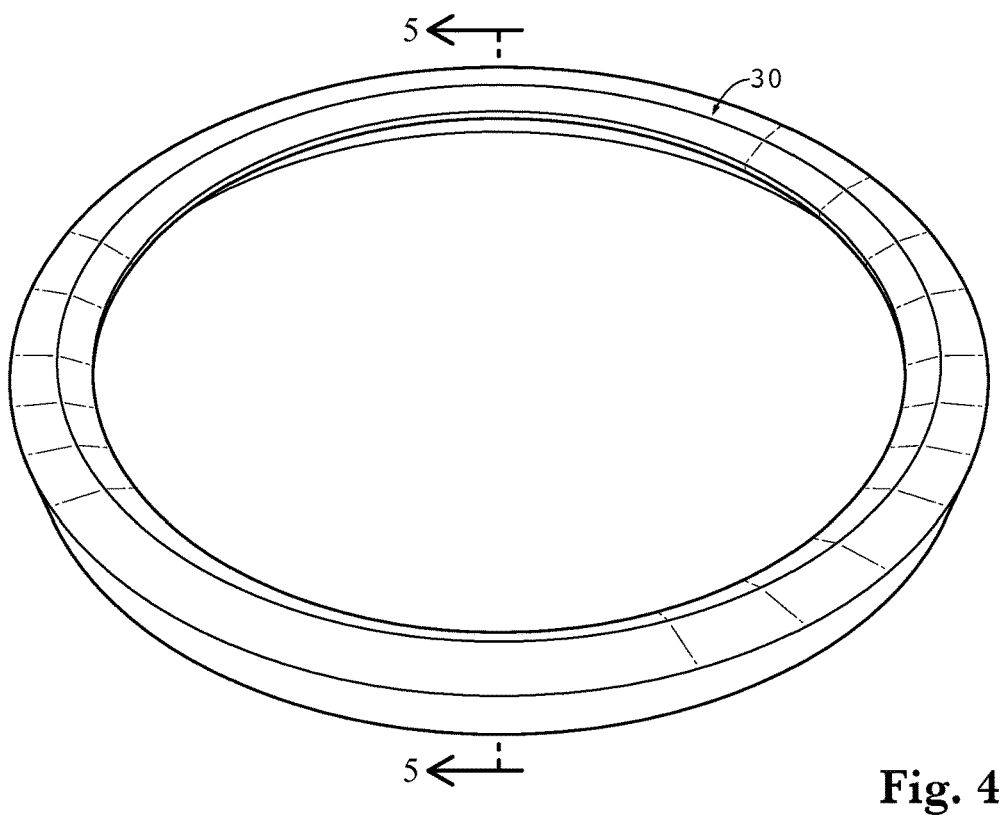
FIG. 4 is a view in perspective illustrating a ring according to the present invention.
Figure 5:
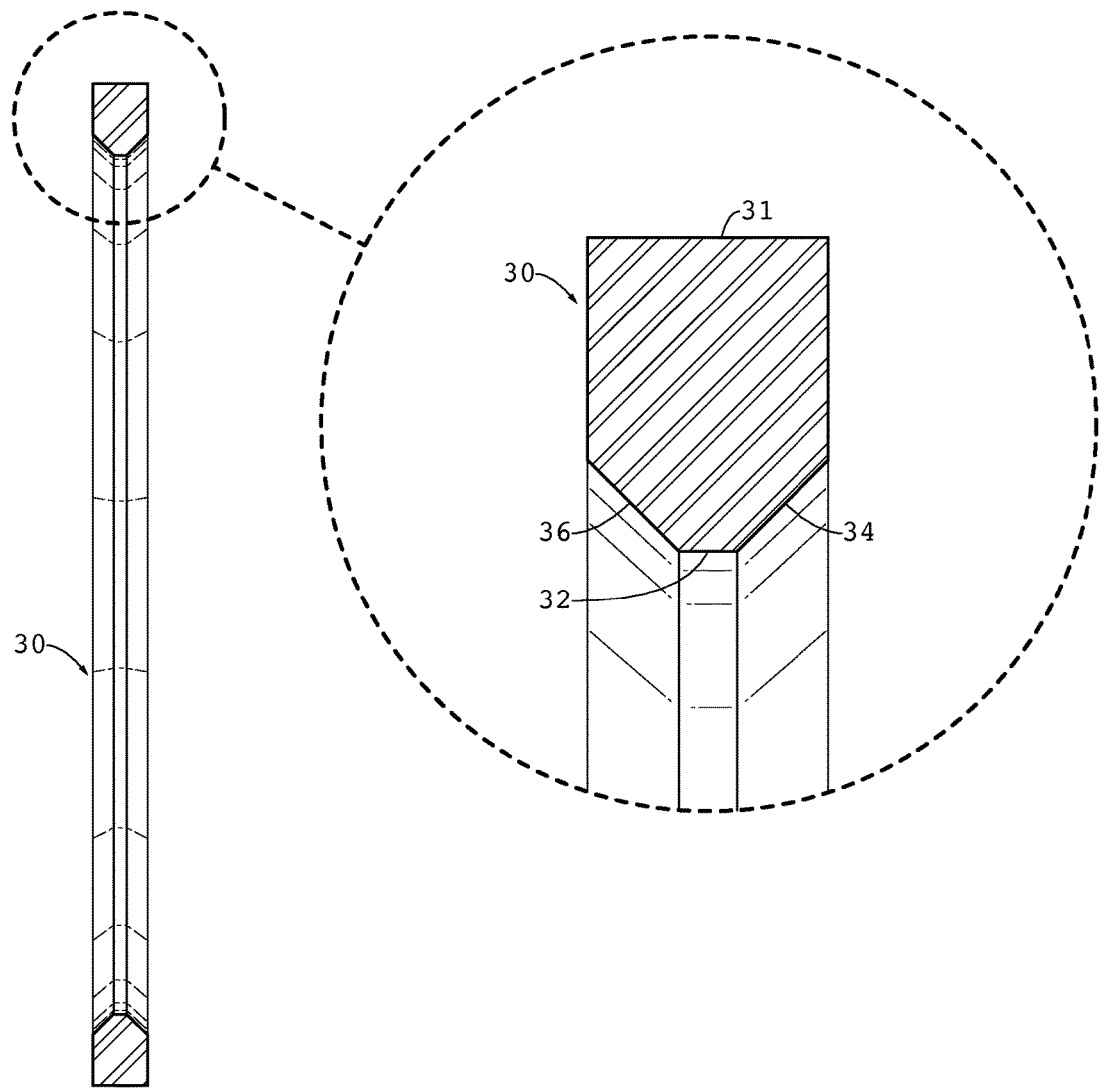
FIG. 5 is a side view in section illustrating the ring of FIG. 4 through the lines 5-5 of FIG. 4.

The ring 30 is shown in FIG. 4 having a circular curvature substantially the same as that of the peripheral rim 14, and an axial length of about the same as that of the disc 10, which is about four inches in the illustrations of FIGS. 3 and 4. In the embodiment shown in FIGS. 3, 4 and 5, the ring 30 has radially-inwardly facing surfaces 32-36 with a diameter at surface 32 that is substantially equal to the diameter of the peripheral rim 14. In one contemplated embodiment, this diameter is about 67 inches, but this is not limiting because virtually any size disc/ring combination is contemplated.

The ring 30 is preferably thick enough to replace the metal worn away from the disc 10, and in a preferred embodiment the radial thickness is about 5 and ½ inches from extreme radially inwardly-facing surface 32 to extreme radially outwardly-facing surface 31. The radially inwardly-facing surfaces of the ring 30 are preferably tapered in section, such as V-shaped (although this could be U-shaped or any similarly advantageous shape) to allow the disc 10 to be placed on the disc's peripheral rim 14, as shown in FIGS. 6 and 7, while permitting gaps on both sides for molten metal to be placed in as described below. The ring 30 thus preferably has three radially inwardly facing surfaces 32, 34 and 36 and one radially outwardly-facing surface 31. The preferred relative angle of the surfaces 34 and 36 is about 90 degrees, and the angles between the surface 32 and both adjacent surfaces 34 and 36 is about 45 degrees.

The surface 32 is preferably about one-half inch wide (axially) and is of substantially the same diameter as the peripheral rim 14. This allows the ring 30 to be placed over the disc 10 with the peripheral rim 14 seating against the radially-inwardly facing surface 32, preferably in a friction fit that prevents separation of the two components without a substantial force. This combination is shown in FIG. 7, with the annular gaps 38 and 39 formed between the surfaces 34 and 36 and the peripheral rim 14, but on opposite sides of the disc 10 and ring 30.

The gaps 38 and 39 are annular and extend around the entire intersection between the disc 10 and the ring 30. In a preferred embodiment, the ring 30 is welded onto the peripheral rim 14 of the disc 10 to replace the cut-away peripheral edge 8, by filling the gaps 38 and 39 with molten metal.

One contemplated means for filling the gaps 38 and 39 with molten metal is to lay the disc 10 down (see FIGS. 10 and 11), and rotate the disc 10 about a vertical axis A while both heating the lower disc surface and applying metal to the upwardly-facing gap (e.g., the gap 39 in FIG. 10) as the disc 10 is oriented in FIG. 10. This rotation about the vertical axis A permits a conventional welding unit 40 to apply a weld bead of molten metal in the gap at a single point, and as the disc 10 rotates beneath that point, the gap fills with an annular bead of metal until it is filled, at which point the welding is halted. After welding of the ring 30 on one side, the disc 10 is turned over and the opposite gap is welded during the above-described heating and rotation.

It is preferred to heat the lower side of the disc while the upper side thereof is being welded to the ring, and this can be accomplished by any conventional apparatus or method. The contemplated apparatus is illustrated in FIG. 10, in which the lower surface of the disc 10 rests upon the heated rotating table 50 while the welding apparatus 40 places molten metal in the annular gap 38 on the upper side of the disc 10 in a conventional welding process. The table 50 is preferably rotated at a suitable velocity about the vertical axis A as the welding apparatus 40 applies molten metal in the gap until a bead 39' is formed therein in the entire annular gap 39, preferably exceeding the void of the annular gap 39 as shown in FIG. 8. While applying the molten metal to the gap 39, the lower surface of the disc 10 is heated by the heated table 50 or another source, such as the thermal input 51, which can be a torch, induction heater, etc. Once the bead 39' is formed, the disc 10 is turned over to the position shown in FIG. 11. As shown in FIG. 11, the side that was welded in the previous step faces downwardly and is heated by the table 50 while the welding apparatus 40 places molten metal in the annular gap 38 on the opposite side during rotation of the table 50. This continues until a bead 38' is formed therein, preferably exceeding the void of the gap 38 as shown in FIG. 8. Once the beads 38' and 39' are formed, the ring 30 and the beads 38' and 39' have all become mechanically fixed to the disc 10, effectively the same as the material of the disc 10 that the ring 30 and the beads 38' and 39' replace.

Upon complete filling (preferably over-filling) of both gaps 38 and 39 with molten metal, which cools to form the solid, annular beads 38' and 39' shown in FIG. 8, the disc/ring/bead combination is then machined to obtain the final shape desired. This is preferably accomplished by hand or machine grinding away the protruding portions of the beads 38' and 39'. The beads 38' and 39' are preferably ground flat to be substantially flush with the surrounding surfaces as shown in the completed shape of FIG. 9. This can be accomplished by a hand, or a hand-held electric, grinder, for example, but any equivalent material-removal equipment is contemplated. One contemplated method of ensuring that the disc 10 is ground to near original shape is by placing the disc 10 on the table 50 and applying a grinding apparatus to the beads 38' and 39' in sequence in place of the welding apparatus 40 shown in FIGS. 10 and 11 and described above. The table 50 and disc 10 can thus be rotated during grinding to avoid the need to move the grinding apparatus.

Once the beads 38' and 39' are flush with the outer surfaces of the disc 10 and the ring 30, the disc 10 and ring 30 combination is heat-treated to form a hard exterior surface that wears well during use of the refurbished disc 10. This can include, for example, carburizing or heating the disc 10 and ring 30 combination above the eutectoid (for steel) temperature or into any other metallurgically-advantageous solid phase and then quenching by suddenly cooling the exterior of the disc 10. Of course, other heat treatments known to a person of ordinary skill can be carried out. Finally, the opening at the center of the disc is preferably machined to ensure that it is round, because it is possible for the center opening to be distorted from a round shape during heating of the disc 10.

Once the refurbished disc 10 has been heat-treated, it is mounted again as part of a rotor body, and hammers and rods are inserted, if necessary, and the refurbished disc 10 is used as part of a rotor body in a conventional manner. The refurbished disc, as part of the rotor body, is thus rotated about a central axis and at least the surface 31 is exposed to the direct and repeated impact of metal objects that are to be comminuted by swinging hammers rotatably mounted between the refurbished disc 10 and at least one adjacent disc. It is also contemplated to replace the hammers of the rotor body when the disc is refurbished and then replaced on the rotor body, but this is not critical.

The heat treatment after the ring is welded to the disc and the excess metal is ground away gives the completed and refurbished disc a hard outer surface. This is due to the ultimate use to which the refurbished disc will be put: massive and high-wear pieces will be forced against the newly replaced edge 31 of the disc, which edge is made up of the ring 30. Of course, it is possible that no heat treatment will be necessary, but this is not contemplated.

In a preferred embodiment of the invention, the ring 30 is rolled from a single piece of material, such as steel. After the overall ring shape is formed, the radially inwardly-facing surface of the ring is machined with precision to bevel the surface to the shape that contacts the peripheral rim 14 of the disc 10. It is preferred that the ring be made of steel, and the steel preferably has a hardness that does not exceed 350-375 Burnell. The preferred maximum Burnell hardness is about 350-375, and the maximum is about 450.

Although it is preferred for the ring to be made of the same material as the disc to which the ring is welded, it is understood that some variations in composition of the metals will exist. This is because at least the central disc portion shown in FIG. 3 is made as one piece that has been cast or otherwise formed into the disc shape. The composition of the disc is very difficult to match exactly. It is understood by the person of ordinary skill that the ring will likely have a slightly different composition than the disc, even if the ring's composition is intended to match the composition of the disc as closely as possible. Furthermore, the metal of the annular beads is likely to also be chemically different from the ring and the disc. Nevertheless, it is preferred that the metals of the disc, the ring and the two beads be as similar as feasible.

As noted above, the ring used in the present invention is preferably made to the size of the disc to which it will be mounted. Because the sizes of discs vary, the sizes of the rings will also vary. Rings can be custom made to fit any disc, and it is also contemplated to have standard sized rings on hand for standard sized discs. It is also contemplated to make a ring for each disc only after the disc is analyzed for shape, size, etc.

The mounting of the new ring on the original disc not only physically extends the effective radius of the disc so as to restore the disc to effectively its original size, but the ring also provides a circumferential strengthening of the disc. Thus, if the disc has become weakened, for example due to radial cracks, the ring provides a substantial strengthening to such a damaged disc once welded in place.

Although the preferred embodiment includes a V-shaped radially inwardly-facing surface on the ring as the tapered surface, it is contemplated to form the disc with a V-shaped radially outwardly-facing surface and the ring with a rectangular cross-section. That is, either the ring or the disc can have a tapered surface that forms annular voids on both sides of the junction of the ring and the disc. Alternatively, both the ring and the disc can have tapered surfaces. A V-shaped surface is not the only possible tapered surface as will become apparent from the description herein.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method of refurbishing a first hammer mill disc that is mounted to a driveshaft adjacent a plurality of hammer mill discs to form a rotor body, the method comprising:
   (a) removing the first disc from the driveshaft;
   (b) removing an outer periphery of the first disc to form a peripheral rim having a defined radius from an axis of rotation of the first disc;
   (c) disposing a ring formed of a single piece of metal, the ring having a radially inwardly facing surface and a radially outwardly facing surface, with the radially inwardly facing surface of the ring abutting the peripheral rim of the first disc;
   (d) welding the ring's radially inwardly facing surface to the peripheral rim;
   (e) mounting the first disc to the driveshaft; and
   (f) rotating the driveshaft and causing objects to impact at least the radially outwardly facing surface of the ring that is welded to the first disc.

2. The method in accordance with claim 1, further comprising heat treating the disc and ring after the ring has been welded to the first disc.

3. The method in accordance with claim 1, wherein the step of welding further comprises:
   (a) welding along a first annular gap formed between the ring and the first disc on a first disc side; and
   (b) welding along a second annular gap formed between the ring and the first disc on a second, opposite side of the disc from the first disc side.

4. The method in accordance with claim 3, wherein the step of welding along the first annular gap further comprises:
   (a) disposing the first disc on a surface of a rotatable table with the second disc side abutting the table surface;
   (b) increasing the temperature of the table surface to heat the disc; and
   (c) welding in the first gap while rotating the table.

5. The method in accordance with claim 4, wherein the step of welding along the second annular gap formed between the ring and the first disc on a second disc side further comprises:
   (a) disposing the first disc on a surface of a rotatable table with the first disc side abutting the table surface;
   (b) increasing the temperature of the table surface to heat the disc; and
   (c) welding in the second gap while rotating the table.

6. A method of refurbishing a hammer mill having metal discs mounted to a driveshaft to form a rotor body, the method comprising:
   (a) removing a first disc from the driveshaft;
   (b) mounting to the driveshaft a disc comprising:
      (i) a central disc portion that is formed of a first metal composition, the central disc portion having a radially-outwardly facing peripheral rim;
      (ii) a ring portion formed of a second metal composition surrounding the central disc portion, the ring having a radially-outwardly facing surface and a radially inwardly-facing surface that abuts the peripheral rim;
      (iii) a first annular bead that is formed of a third metal composition that is interposed between the peripheral rim and the radially inwardly-facing surface on a first side of the ring;
      (iv) a second annular bead that is interposed between the peripheral rim and the radially inwardly-facing surface on a second, opposite side of the ring from the first side; and
   (d) rotating the driveshaft and causing objects to impact at least the radially-outwardly facing surface of the ring.

* * * * *